(12) United States Patent
Nemoto et al.

(10) Patent No.: US 10,243,194 B2
(45) Date of Patent: Mar. 26, 2019

(54) SEALED BATTERY AND SEALED BATTERY MANUFACTURING METHOD

(71) Applicant: TOYOTA JIDOSHA KABUSHIKI KAISHA, Toyota-shi, Aichi-ken (JP)

(72) Inventors: Yuta Nemoto, Okazaki (JP); Tomohiro Ono, Toyota (JP); Toshinori Okura, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/788,245

(22) Filed: Oct. 19, 2017

(65) Prior Publication Data

US 2018/0130995 A1 May 10, 2018

(30) Foreign Application Priority Data

Nov. 9, 2016 (JP) .................. 2016-219192

(51) Int. Cl.
- *H01M 2/30* (2006.01)
- *H01M 2/02* (2006.01)
- *H01M 10/04* (2006.01)
- *H01M 2/06* (2006.01)

(52) U.S. Cl.
CPC ............ *H01M 2/30* (2013.01); *H01M 2/0277* (2013.01); *H01M 2/06* (2013.01); *H01M 10/04* (2013.01)

(58) Field of Classification Search
CPC ........ H01M 2/30; H01M 2/0277; H01M 2/06; H01M 10/04
See application file for complete search history.

(56) References Cited

FOREIGN PATENT DOCUMENTS

| JP | 2009-259524 A | 11/2009 |
|----|---------------|---------|
| JP | 2015153521 A  | 8/2015  |

*Primary Examiner* — Helen Oi K Conley
(74) *Attorney, Agent, or Firm* — Sughrue Mion, PLLC (57) ABSTRACT

A first terminal including an insertion hole is placed on one side of a lid of a battery case with one or more insulating materials interposed therebetween. An inner circumferential surface defining the insertion hole includes a first rim and a second rim at a position farther away from the one or more insulating materials than the first rim is. The second rim includes an inclined surface with a recess that includes a bottom at a position set back inside the first terminal from the inclined surface. The second terminal has a shaft part inserted through a mounting hole of the lid and the insertion hole. A leading end of the shaft part is riveted, and at least a portion of the shaft part reaches into the recess.

11 Claims, 4 Drawing Sheets

SEALED BATTERY AND SEALED BATTERY MANUFACTURING METHOD

INCORPORATION BY REFERENCE

The disclosure of Japanese Patent Application No. 2016-219192 filed on Nov. 9, 2016 including the specification, drawings and abstract is incorporated herein by reference in its entirety.

BACKGROUND

1. Technical Field

The present disclosure relates to a sealed battery and a sealed battery manufacturing method.

2. Description of Related Art

Japanese Unexamined Patent Application Publication No. 2009-259524 discloses a mounting structure of a terminal of a battery case including a lid body of the battery case, a first terminal, and a rivet member (also called a second terminal or a collector terminal). Here, the lid body of the battery case and the first terminal each have a hole formed therein. The rivet member is a member that is attached from inside the battery case, and has a cylindrical part and a collar part. The cylindrical part is inserted through the hole formed in the lid body and the hole formed in the first terminal. A leading end of the cylindrical part is pushed out and deformed so as to be pressed against a periphery of the hole in the first terminal. Thus, the lid body and the first terminal are fixed while held between the collar part and the portion formed by pushing out the leading end (riveted portion) of the rivet member. Thereafter, a part of the riveted portion and the first terminal are welded together.

SUMMARY

According to the knowledge of the present inventors, under severe conditions such as where the battery is subjected to vibration or shock accompanied by a high rate of acceleration, especially in an ultralow temperature environment that can arise in frigid regions, the rivet member and the terminal can partially come apart at the joint and cause a rise in resistance. It is desirable that the rivet member and the terminal be joined together more firmly.

A first aspect of the present disclosure relates to a sealed battery. The sealed battery includes a battery case, one or more insulating materials, a metal first terminal, and a metal second terminal. The battery case includes a mounting hole. The one or more insulating materials are provided around the mounting hole. The metal first terminal is placed on one side of the battery case with the one or more insulating materials interposed between the battery case and the first terminal, and has an insertion hole at a position corresponding to the mounting hole. An inner circumferential surface of the first terminal defining the insertion hole has a first rim and a second rim at a position farther away from the one or more insulating materials than the first rim is. The second rim includes an inclined surface. A diameter of the insertion hole at the inclined surface increases gradually in a direction away from the one or more insulating materials. The inclined surface includes an open recess. The recess includes a bottom at a position set back inside the first terminal from the inclined surface. The metal second terminal is placed on other side of the battery case opposite to the one side with the insulating materials interposed between the battery case and the second terminal. The second terminal has a shaft part. The shaft part is inserted through the mounting hole and the insertion hole. A leading end of the shaft part is crushed and riveted on the first terminal. At least a portion of the shaft part reaches into the recess in the inclined surface of the first terminal.

Moreover, in the first aspect of the present disclosure, the first terminal and the second terminal may be made of different materials. In this case, the first terminal and the second terminal are made of different materials and therefore have different coefficients of expansion and contraction relative to temperature changes, but the above configuration does not allow the first terminal and the second terminal to easily come apart at the joint.

Moreover, in the first aspect of the present disclosure, the width of the recess may be, for example, within a range from 0.1 mm to 0.3 mm. The depth of the recess may be, for example, within a range from 0.3 mm to 0.7 mm.

Moreover, in the first aspect of the present disclosure, the first terminal may be placed on an outer side of the battery case.

Moreover, in the first aspect of the present disclosure, the first terminal may be placed on an inner side of the battery case.

A second aspect of the present disclosure relates to a sealed battery manufacturing method. A battery case having a mounting hole, a metal first terminal including an insertion hole, a metal second terminal including a shaft part that is insertable through the mounting hole and the insertion hole, and one or more insulating materials are prepared. Next, the first terminal is placed on one side of the battery case. Here, the one or more insulating materials are interposed between the battery case and the first terminal, and the mounting hole and the insertion hole are aligned with each other. Moreover, the second terminal is placed on other side of the battery case opposite to the one side. Here, the one or more insulating materials are interposed between the battery case and the second terminal, and the shaft part is inserted through the mounting hole and the insertion hole. Then, a leading end of the shaft part is crushed, and the leading end is riveted on the first terminal. Here, an inner circumferential surface of the prepared first terminal defining the insertion hole includes a first rim and a second rim at a position farther away from the one or more insulating materials than the first rim is. The second rim includes an inclined surface. A diameter of the insertion hole at the inclined surface increases gradually in a direction away from the insulating materials. The inclined surface includes an open recess. The recess has a bottom at a position set back inside the first terminal from the inclined surface. In the riveting process, a portion of the shaft part reaches into the recess in the inclined surface of the first terminal.

Moreover, in the second aspect of the present disclosure, the leading end of the shaft part may include a cylindrical shape. In the riveting process, a rotating member may be pressed against the cylindrical leading end of the shaft part while being moved along the leading end in a circumferential direction of the insertion hole.

Moreover, in the second aspect of the present disclosure, the first terminal and the second terminal may be made of different materials. The width of the recess may be, for example, within a range from 0.1 mm to 0.3 mm. The depth of the recess may be, for example, within a range from 0.3 mm to 0.7 mm.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of a sealed battery proposed herein will be described below. It should be understood that the embodiment described herein is not intended to limit the present disclosure. Unless otherwise mentioned, the disclosure is not limited to the embodiment described herein. The drawings are schematic views and do not necessarily exactly represent the actual components.

Figure 1:
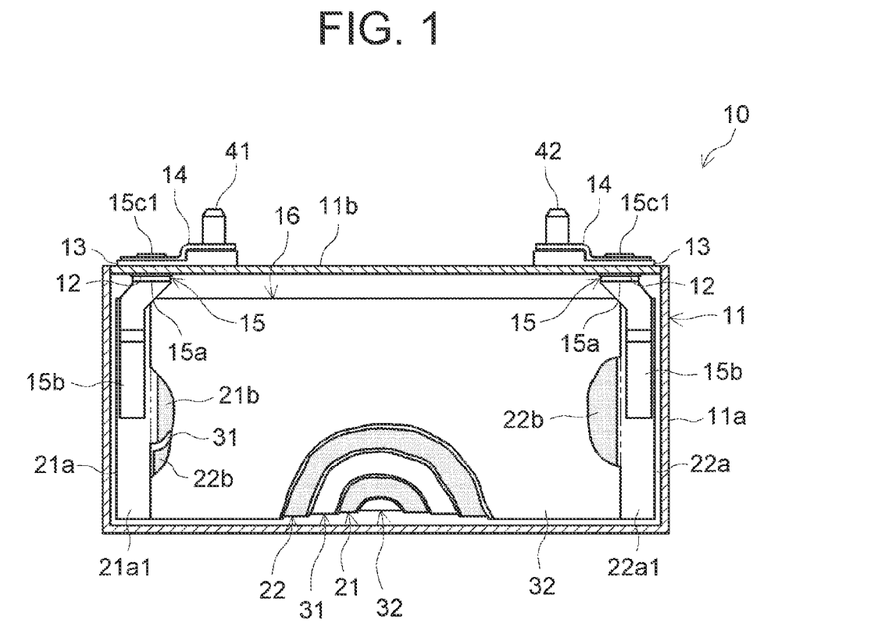
FIG. 1 is a partial sectional view of a sealed battery 10 according to an embodiment of the present disclosure.
Figure 2:
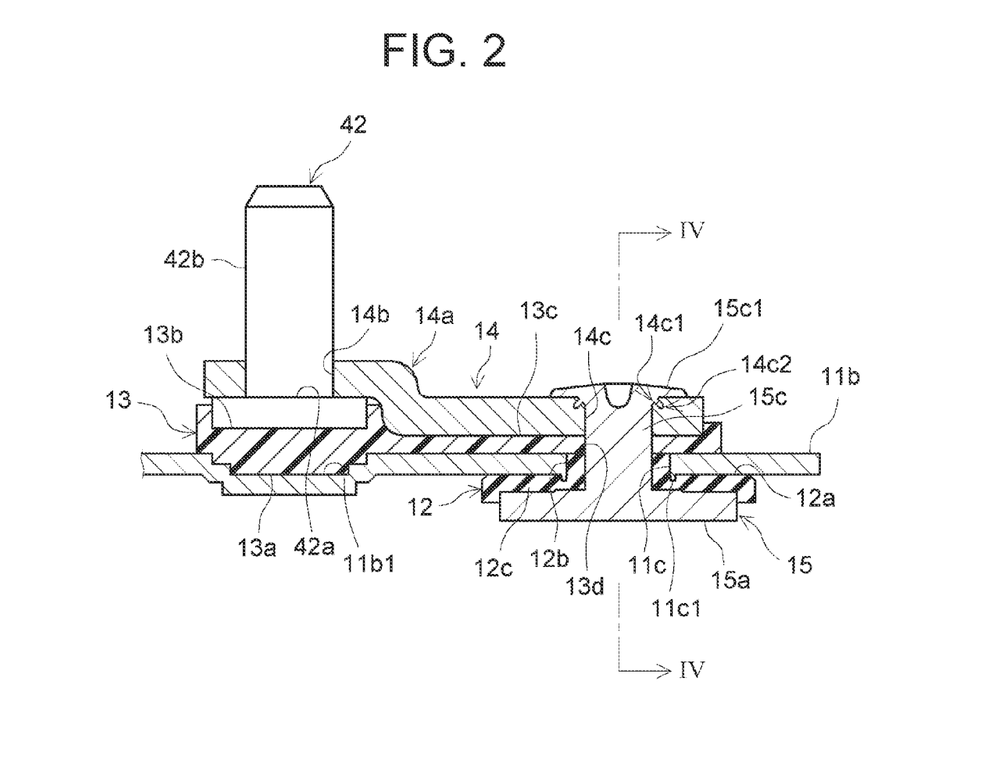
FIG. 2 is a sectional view showing a part where a first terminal 14 and a second terminal 15 are mounted on a battery case 11.

FIG. 1 is a partial sectional view of a sealed battery 10 according to the embodiment of the present disclosure. FIG. 1 depicts a state where an inside of a substantially cuboid battery case 11 is exposed along a wider surface on one side thereof. FIG. 2 is a sectional view showing a part where a first terminal 14 and a second terminal 15 are mounted on the battery case 11. As shown in FIG. 1 and FIG. 2, the sealed battery 10 includes the battery case 11, insulating materials 12, 13, the first terminals 14, the second terminals 15, and an electrode body 16.

Here, as shown in FIG. 1, the first terminals 14 and the second terminals 15 are mounted on the battery case 11 through the insulating materials 12, 13. The electrode body 16 and an electrolyte solution are housed inside the battery case 11. The electrode body 16 is housed inside the battery case 11 while covered with an insulating film etc. (not shown). Thus, the electrode body 16 is insulated from the battery case 11. The electrode body 16 includes a positive electrode element, a negative electrode element, and separators of the sealed battery 10.

In this embodiment, the electrode body 16 includes a positive electrode sheet 21 as the positive electrode element, a negative electrode sheet 22 as the negative electrode element, and separator sheets 31, 32 as the separators. The positive electrode sheet 21, the first separator sheet 31, the negative electrode sheet 22, and the second separator sheet 32 are long band-like members.

The positive electrode sheet 21 has a positive electrode collector foil 21a (e.g., an aluminum foil) of predetermined width and thickness, on each side of which a positive electrode active material layer 21b containing a positive electrode active material is formed except for a blank portion 21a1 that is provided at a constant width at one end of the positive electrode collector foil 21a in a width direction. For example, in a lithium-ion secondary battery, the positive electrode active material is a material such as a lithium transition metal composite material that can release lithium ions during charge and absorb lithium ions during discharge. However, the positive electrode active material is not limited to a particular material, as various materials other than a lithium transition metal composite material are commonly offered.

The negative electrode sheet 22 has a negative electrode collector foil 22a (here, a copper foil) of predetermined width and thickness, on each side of which a negative electrode active material layer 22b containing a negative electrode active material is formed except for a blank portion 22a1 that is provided at a constant width at an edge on one side of the negative electrode collector foil 22a in a width direction. For example, in a lithium-ion secondary battery, the negative electrode active material is a material such as natural graphite that can occlude lithium ions during charge and release the lithium ions, occluded during charge, during discharge. However, the negative electrode active material is not limited to a particular material, as various materials other than natural graphite are commonly offered.

For example, porous resin sheets that have required heat resistance and allow passage of an electrolyte are used as the separator sheets 31, 32. However, the separator sheets 31, 32 are not limited to particular ones, as various separator sheets are offered.

Here, for example, the width of the negative electrode active material layer 22b is larger than the width of the positive electrode active material layer 21b. The width of the separator sheets 31, 32 is larger than the width of the negative electrode active material layer 22b. The blank portion 21a1 of the positive electrode collector foil 21a is on one side of the battery case 11, and the blank portion 22a1 of the negative electrode collector foil 22a is on the opposite side of the battery case 11, in the width direction. The positive electrode sheet 21, the first separator sheet 31, the negative electrode sheet 22, and the second separator sheet 32 are wound together after being laminated in this order with their respective long sides directed in the same direction. The negative electrode active material layer 22b covers the positive electrode active material layer 21b with the separator sheets 31, 32 interposed therebetween. The negative electrode active material layer 22b is covered with the separator sheets 31, 32. The blank portion 21a1 of the positive electrode collector foil 21a protrudes from the separator sheets 31, 32 on one side in the width direction. The blank portion 22a1 of the negative electrode collector foil 22a protrudes from the separator sheets 31, 32 on the opposite side in the width direction.

In this embodiment, the battery case 11 has a flat rectangular housing space, and includes a case body 11a and a lid 11b. The case body 11a has a shape of a flat, substantially cuboid container, and one side of the case body 11a defined by long sides and short sides is open. The lid 11b is a plate-like member that has a shape matching the opening of the case body 11a and is attached to the opening. The first terminal 14 and the second terminal 15 are mounted on each side of the lid 11b in a longitudinal direction. As shown in FIG. 1, the electrode body 16 is flattened along a plane including an axis of winding so as to be housed inside the case body 11a of the battery case 11. The blank portion 21a1 of the positive electrode collector foil 21a is disposed on one side and the blank portion 22a1 of the negative electrode collector foil 22a is disposed on the opposite side along the axis of winding of the electrode body 16. The blank portion 21a1 of the positive electrode collector foil 21a and the blank portion 22a1 of the negative electrode collector foil 22a are mounted on the second terminals 15 that are mounted respectively on both sides of the lid 11b in the longitudinal direction. The electrode body 16 is housed inside the battery case 11 while thus mounted on the lid 11b.

In this embodiment, as shown in FIG. 1, the first terminal 14 and the second terminal 15 are mounted on each side of the lid 11b in the longitudinal direction. Here, the second terminal 15 has a base part 15a and a mounting piece 15b. The base part 15a is mounted on the lid 11b through the first insulating material 12. The mounting piece 15b extends from the base part 15a into the battery case 11. The blank portion 21a1 of the positive electrode collector foil 21a of the electrode body 16 is welded to the mounting piece 15b of the second terminal 15 on the left side in FIG. 1. The blank portion 22a1 of the negative electrode collector foil 22a of the electrode body 16 is welded to the mounting piece 15b of the second terminal 15 on the right side in FIG. 1. On an outer side of the lid 11b, a positive electrode connection terminal 41 is mounted on the first terminal 14 on the left side. Here, the outer side means the outer side of the battery case 11. An inner side means the inner side of the battery case 11. A negative electrode connection terminal 42 is mounted on the first terminal 14 on the right side. As shown in FIG. 2, a recess 11b1 recessed at a position corresponding to a part where the connection terminal 42 is mounted is provided in an outer surface of the lid 11b.

FIG. 2 shows a part of the lid 11b where the first terminal 14 and the second terminal 15 on the negative electrode side are mounted, in a cross-section of the lid 11b cut along a long-side direction at an intermediate position in a short-side direction. As shown in FIG. 2, the lid 11b has a mounting hole 11c formed therein that is used to mount the first terminal 14 and the second terminal 15. The mounting hole 11c (see FIG. 2) used to mount the first terminal 14 and the second terminal 15 is formed on each side of the lid 11b.

The part where the first terminal 14 and the second terminal 15 on the positive electrode side are mounted has the same structure. Materials that can withstand potentials required respectively on the positive electrode side and the negative electrode side are used. Thus, for example, aluminum or an aluminum alloy is used for the first terminal 14, the second terminal 15, and the connection terminal 41 on the positive electrode side. For example, copper or a copper alloy is used for the first terminal 14, the second terminal 15, and the connection terminal 42 on the negative electrode side.

The insulating materials 12, 13 are attached around the mounting hole 11c. The first insulating material 12 is disposed on the inner side of the lid 11b and insulates the lid 11b and the second terminal 15 from each other. In this embodiment, the first insulating material 12 is formed by a resin member (in this embodiment, a fluorine-based resin) having required elasticity. The first insulating material 12 is also called a gasket, and keeps the mounting hole 11c sealed. In this embodiment, as shown in FIG. 2, the first insulating material 12 has a base part 12a, a cylindrical part 12b, and a reception part 12c. The base part 12a is a flat plat-like part attached to an inner surface of the lid 11b. The cylindrical part 12b is a part protruding from the base part 12a and attached to an inner circumferential surface of the mounting hole 11c. The cylindrical part 12b has an inside diameter according to the outside diameter of a shaft part 15c provided in the second terminal 15 (to be described later) so that the shaft part 15c can be inserted through the cylindrical part 12b. The reception part 12c is provided in a lower surface of the first insulating material 12. The reception part 12c is a part having a recess matching the shape of the base part 15a of the second terminal 15 (to be described later) and used to position the base part 15a.

The second insulating material 13 is a member that is disposed on the outer side of the lid 11b and insulates the lid 11b, the first terminal 14, and the connection terminal 42 from each another. The second insulating material 13 is formed by a resin member (in this embodiment, a polyamide-based resin), and is also called an insulator. In this embodiment, as shown in FIG. 2, a protrusion 13a is provided on a lower surface of the second insulating material 13 so as to be attached in the recess 11b1 of the lid 11b. A recess 13b in which the negative electrode connection terminal 42 is disposed and a recess 13c in which the first terminal 14 is attached are provided in an upper surface of the second insulating material 13. The recess 13c in which the first terminal 14 is attached has a through-hole 13d formed therein at a position corresponding to the mounting hole 11c formed in the lid 11b. The through-hole 13d has an inside diameter according to the outside diameter of the shaft part 15c provided in the second terminal 15 (to be described later) so that the shaft part 15c can be inserted through the through-hole 13d.

In this embodiment, the insulating materials 12, 13 are composed of two members. The insulating materials 12, 13 are members insulating the lid 11b, the first terminals 14, and the second terminals 15 from each other, and the materials, shapes, and the structures thereof are not limited to the above examples. The shape etc. of the mounting hole 11c formed in the lid 11b is not limited to those in the above structure, either. Thus, the insulating materials 12, 13 may be composed of one member, or may be composed of two or more members.

The connection terminal 42 has a collar part 42a and a shaft part 42b. The collar part 42a is positioned and attached in the recess 13b provided in the second insulating material 13 that is disposed on the outer side of the lid 11b. Therefore, the collar part 42a and the recess 13b have preferably matching shapes. The shaft part 42b is a part which serves as an external output terminal, and on which, for example, a bus bar is mounted to form a battery pack.

Figure 3:
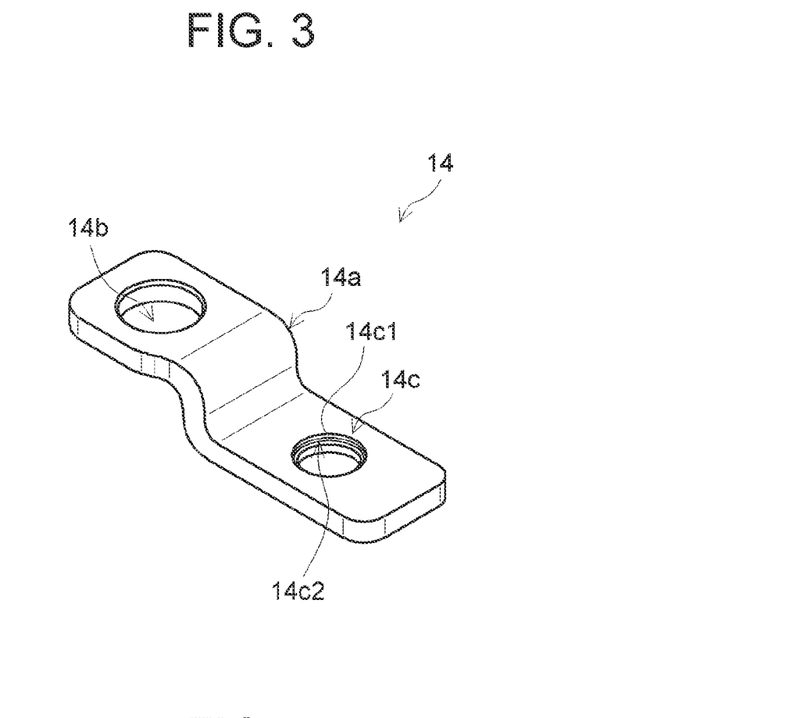
FIG. 3 is a perspective view of the first terminal 14.

As shown in FIG. 2, the first terminal 14 is placed on one side (in this embodiment, on the outer side) of the battery case 11 with the second insulating material 13 interposed therebetween. FIG. 3 is a perspective view of the first terminal 14. In this embodiment, the first terminal 14 is a member that is disposed on the second insulating material 13 disposed on the outer side of the lid 11b and retains the connection terminal 42. As shown in FIG. 3, the first terminal 14 is a plate-like member disposed along the longitudinal direction of the lid 11b. A step 14a is provided at an intermediate part in a longitudinal direction of the first terminal 14. An attachment hole 14b in which the shaft part 42b of the connection terminal 42 is attached is formed on one side of the step 14a. On the opposite side of the step 14a, an insertion hole 14c through which the shaft part 15c of the second terminal 15 (to be described later) is inserted is formed. The insertion hole 14c is formed at a position that corresponds to the through-hole 13d of the second insulating material 13 when the first terminal 14 is disposed on the second insulating material 13.

An inclined surface 14c1 and a recess 14c2 are formed in the insertion hole 14c. The inclined surface 14c1 is located in an inner circumferential surface of the first terminal 14 defining the insertion hole 14c, and is formed at a rim on the outer side of the battery case 11. Here, of the two rims of the inner circumferential surface of the first terminal 14, a rim on the inner side of the battery case 11 corresponds to the first rim. Of the two rims of the inner circumferential surface of the first terminal 14, the rim on the outer side of the battery case 11 corresponds to the second rim. The diameter of insertion hole 14c at the inclined surface 14c1 increases gradually toward the outer side. The recess 14c2 is formed so as to open in the inclined surface 14c1. The recess 14c2 has a bottom 14c3 at a position set back inside the first terminal 14 from the inclined surface 14c1. In this embodiment, the inclined surface 14c1 and the recess 14c2 are located in the inner circumferential surface of the first terminal 14 defining the insertion hole 14c, and extend continuously in a circumferential direction at the rim on the outer side of the battery case 11. The recess 14c2 is formed so as to extend into the first terminal 14 from an intermediate part in a height direction of the inclined surface 14c1. As a result, the recess 14c2 extends from the inclined surface 14c1 around the insertion hole 14c inside the first terminal 14, and as seen from above, a portion of the first terminal 14 overhangs the recess 14c2.

The second terminal 15 is placed on the opposite side (in this embodiment, on the inner side) of the battery case 11 with the second insulating material 13 interposed therebetween. As shown in FIG. 1 and FIG. 2, the second terminal 15 has the base part 15a, the mounting piece 15b, and the shaft part 15c. Of these parts, the base part 15a is mounted on the lid 11b through the first insulating material 12. As the mounting piece 15b has already been described, overlapping description will be omitted here.

The shaft part 15c of the second terminal 15 is inserted through the mounting hole 11c of the lid 11b and the insertion hole 14c. In this embodiment, the cylindrical part 12b of the first insulating material 12 is attached in the mounting hole 11c of the lid 11b. The shaft part 15c of the second terminal 15 is inserted through the inside of the cylindrical part 12b. The shaft part 15c of the second terminal 15 is further inserted through the through-hole 13d of the second insulating material 13 and the insertion hole 14c of the first terminal 14 disposed on the second insulating material 13.

A leading end 15c1 of the shaft part 15c is crushed and riveted around the insertion hole 14c on the outer side of the first terminal 14. At least a portion of the shaft part 15c reaches into the recess 14c2 formed in the inclined surface 14c1 of the first terminal 14.

Figure 4:
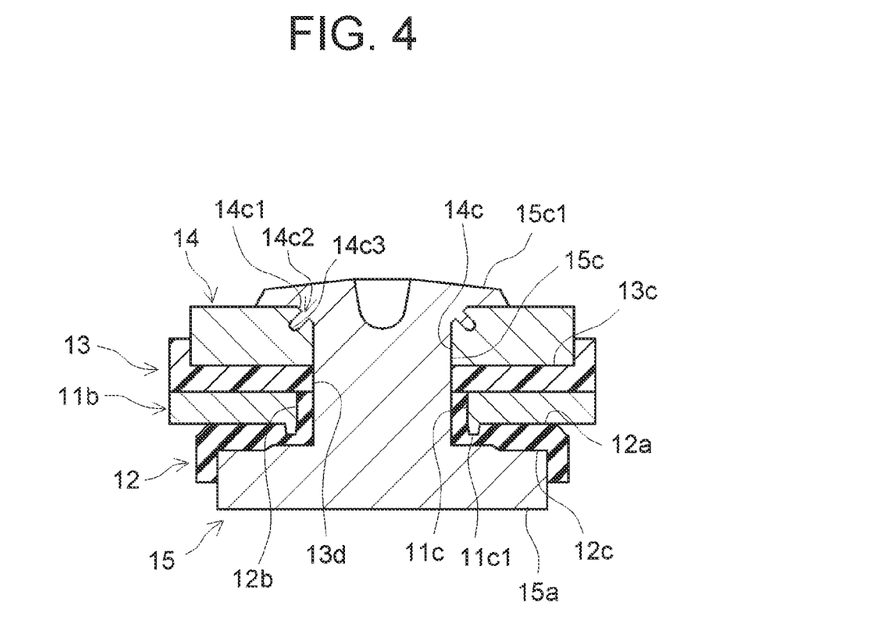
FIG. 4 is a sectional view taken along the line IV-IV of FIG. 2.

Here, FIG. 4 is a sectional view taken along the line IV-IV of FIG. 2, and is a lateral sectional view of the lid 11b in the width direction showing a part where the first terminal 14 and the second terminal 15 are joined together.

As shown in FIG. 4, in the part where the first terminal 14 and the second terminal 15 are joined together, the second terminal 15 acts like a rivet. Specifically, the shaft part 15c of the second terminal 15 is inserted through the cylindrical part 12b of the first insulating material 12 attached in the mounting hole 11c of the lid 11b, the through-hole 13d of the second insulating material 13, and the insertion hole 14c of the first terminal 14. The leading end 15c1 of the shaft part 15c is crushed and riveted around the insertion hole 14c of the first terminal 14. As a result, the second terminal 15 is fixed while holding the first insulating material 12, the lid 11b, the second insulating material 13, and the first terminal 14 between the base part 15a and the leading end 15c1 of the shaft part 15c. Moreover, at least a portion of the shaft part 15c reaches into the recess 14c2 formed in the inclined surface 14c1 of the first terminal 14. The recess 14c2 is open in the inclined surface 14c1 and extends from the inclined surface 14c1 into the first terminal 14. Thus, with a portion of the shaft part 15c of the second terminal 15 reaching into the recess 14c2, this structure does not allow the first terminal 14 and the second terminal 15 to easily come apart.

In particular, a portion of the shaft part 15c of the second terminal 15 reaches into the recess 14c2 that is open in the inclined surface 14c1 and recessed inside the first terminal 14 from the inclined surface 14c1, so that required joint strength can be secured without the leading end of the shaft part 15c being welded to the first terminal 14. For example, the joint strength to withstand vibration and shock accompanied by acceleration in an ultralow temperature environment that can arise in frigid regions can be provided. Again, a portion of the shaft part 15c of the second terminal 15 reaches into the recess 14c2 that is open in the inclined surface 14c1 and recessed inside the first terminal 14 from the inclined surface 14c1. The shaft part 15c of the second terminal 15 is deformed so as to reach into the recess 14c2 in the inclined surface 14c1. In this process, an oxide film on a surface of the shaft part 15c is torn and a new surface is revealed, and thus condensation of a surface oxide film at the joint part is reduced. As a result, resistance at the joint part of the first terminal 14 and the second terminal 15 decreases.

In this embodiment, as described above, the first terminal 14 having the insertion hole 14c, the inclined surface 14c1, and the recess 14c2 is disposed on the outer side of the battery case 11, and the second terminal 15 having the shaft part 15c is disposed on the inner side of the battery case 11. In the sealed battery proposed herein, a terminal having parts corresponding to the insertion hole 14c, the inclined surface 14c1, and the recess 14c2 may be disposed on the inner side of the battery case 11, while a terminal having a part corresponding to the shaft part 15c may be disposed on the outer side of the battery case 11.

For example, parts corresponding to the insertion hole 14c, the inclined surface 14c1, and the recess 14c2 of the first terminal 14 may be provided in the terminal disposed on the inner side of the battery case 11. In this case, a part corresponding to the shaft part 15c of the second terminal 15 may be provided in the terminal disposed on the outer side of the battery case 11. The part corresponding to the shaft part 15c provided in the terminal disposed on the outer side of the battery case 11 may be inserted through the insertion hole 14c provided in the other terminal disposed on the inner side of the battery case 11. Then, the leading end of the shaft part 15c may be crushed and riveted around the insertion hole 14c of the other terminal. As a result, a portion of the part corresponding to the shaft part 15c should be deformed and reach into the part corresponding to the recess 14c2. Thus, the first terminal 14 is not limited to a so-called external terminal that is disposed on the outer side of the battery case 11. The second terminal 15 is not limited to a so-called internal terminal that is disposed on the inner side of the battery case 11. In short, the joint structure of the terminals disposed on the inner side and the outer side of the battery case 11 may have those terminals on the opposite sides of the battery case 11 from those in the embodiment shown in FIG. 2 and FIG. 4.

The first terminal 14 and the second terminal 15 may be made of different materials. For example, in a secondary battery having such a charge potential that an open circuit voltage between the positive electrode and the negative electrode is about 4V, aluminum or an aluminum alloy is used as the positive electrode-side electrode terminal so as to withstand the required potential. In some cases, different materials are used for the first terminal 14 and the second terminal 15. For example, in the embodiment shown in FIG. 2 and FIG. 4, aluminum (e.g., aluminum with purity 99.50% or higher (A1050)) that is a soft material is preferably used for the second terminal 15 of the positive electrode having the shaft part 15c to be crushed. On the other hand, for example, an aluminum alloy having excellent corrosion resistance and strength (e.g., A5052) is preferably used for the first terminal 14. In the case where different materials are thus used for the first terminal 14 and the second terminal 15, the first terminal 14 and the second terminal 15 undergo thermal expansion differently in an ultralow temperature environment. According to the above embodiment, even in such a case, the joined first terminal 14 and second terminal 15 do not easily come apart as at least a portion of the shaft part 15c of the second terminal 15 reaches into the recess 14c2 formed in the inclined surface 14c1 of the first terminal 14.

From this perspective, the width of the recess 14c2 opening in the inclined surface 14c1 is preferably, for example, within a range from 0.1 mm to 0.3 mm (e.g., 0.2 mm). Here, the width of the recess 14c2 is defined by the width of the recess 14c2 opening along the inclined surface 14c1 in an axial direction of the insertion hole 14c.

The depth of the recess 14c2 is within a range from 0.3 mm to 0.7 mm (e.g., from 0.4 mm to 0.6 mm). Here, the depth of the recess 14c2 can be defined by the distance from the inclined surface 14c1 to a deepest point in the recess 14c2.

Figure 5:
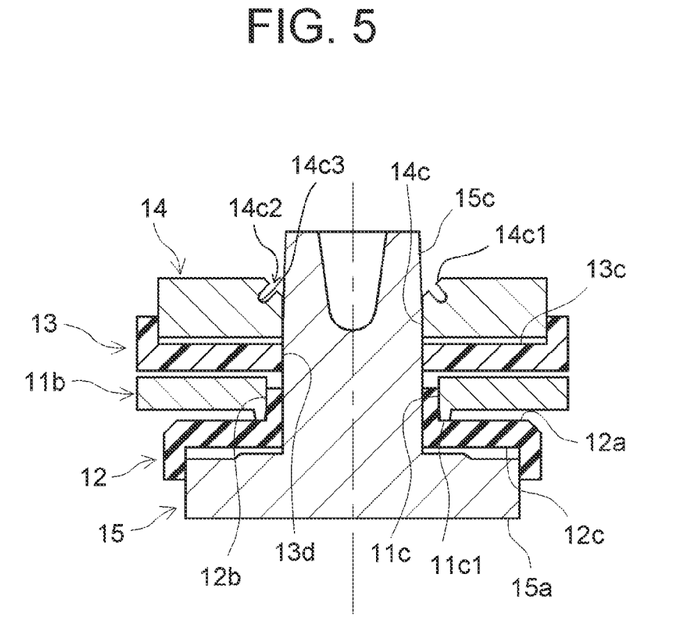
FIG. 5 is a sectional view illustrating a step in a sealed battery manufacturing method.

For example, such a recess 14c2 can be formed by press molding or electric discharge machining. However, the method of forming the recess 14c2 is not limited to these examples, and various other methods can be used. In this embodiment, the recess 14c2 is formed in the inclined surface 14c1 continuously in the circumferential direction. However, unlike in this embodiment, the recess 14c2 may be formed in the inclined surface 14c1 intermittently in the circumferential direction. For example, four recesses 14c2 may be formed at 90-degree intervals in the circumferential direction. Alternatively, three, six, or eight recesses 14c2 may be formed at 120-, 60-, or 45-degree intervals, respectively, Next, a manufacturing method of a sealed battery having such a joint structure of the first terminal 14 and the second terminal 15 will be described. Here, FIG. 5 to FIG. 7 are sectional views illustrating steps in the sealed battery manufacturing method.

In this sealed battery manufacturing method, the battery case 11 having the mounting hole 11c, the metal first terminal 14 having the insertion hole 14c corresponding to the mounting hole 11c, the metal second terminal 15 having the shaft part 15c that is insertable through the mounting hole 11c and the insertion hole 14c, and one or more insulating materials (in this embodiment, the first insulating material 12 and the second insulating material 13) are prepared.

Figure 6:
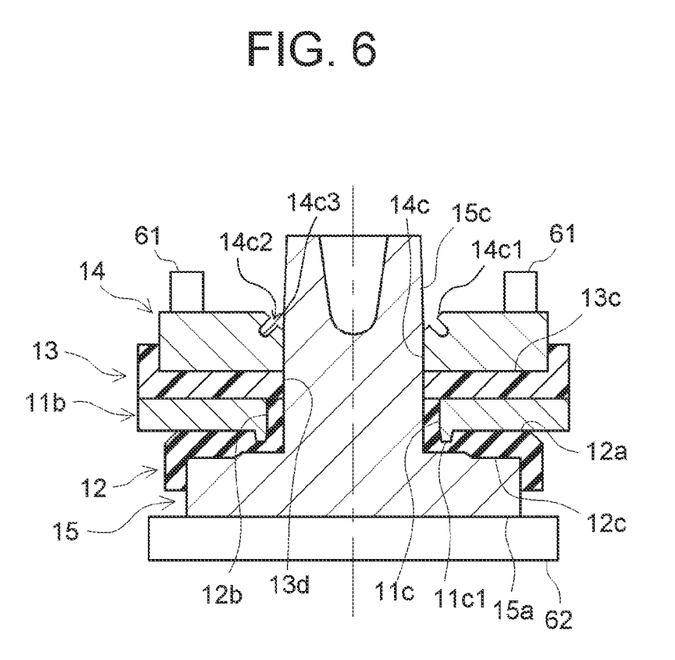
FIG. 6 is a sectional view illustrating a step in the sealed battery manufacturing method.
Figure 7:
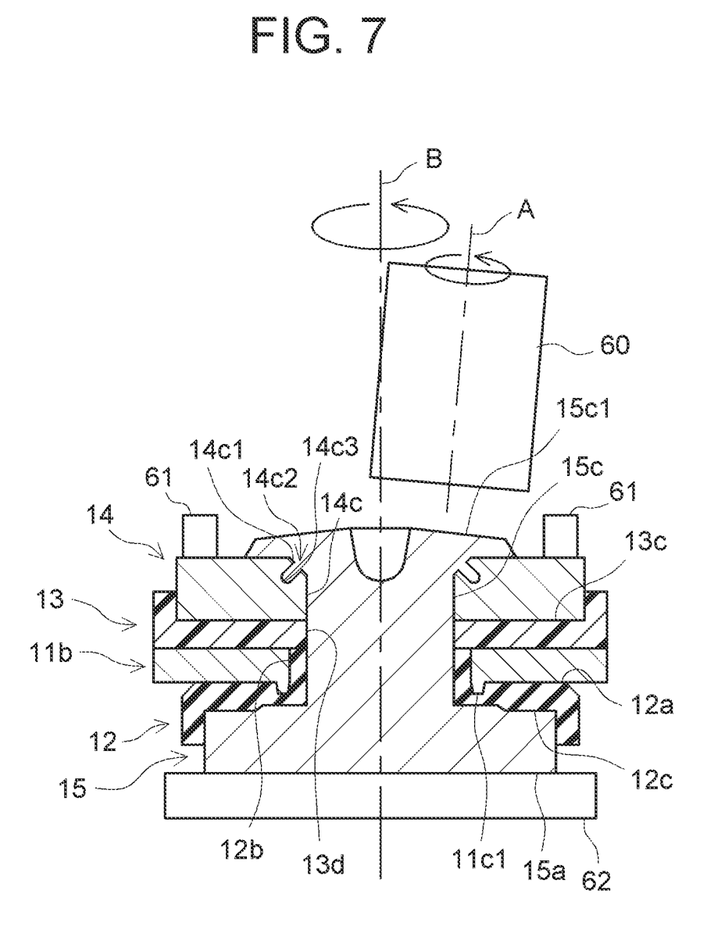
FIG. 7 is a sectional view illustrating a step in the sealed battery manufacturing method.

Next, as shown in FIG. 6, the first terminal 14 is placed on one side of the battery case 11 (in the embodiment shown in FIG. 5, on the outer side of the battery case 11) with the second insulating material 13 interposed therebetween and with the mounting hole 11c and the insertion hole 14c aligned with each other.

Next, the second terminal 15 is placed on the opposite side of the battery case 11 (in the embodiment shown in FIG. 5, on the inner side of the battery case 11) with the first insulating material 12 interposed therebetween and with the shaft part 15c inserted through the mounting hole 11c and the insertion hole 14c.

Next, the leading end of the shaft part 15c is crushed and riveted around the insertion hole 14c on the outer side of the first terminal 14.

Here, at the rim on the outer side of the battery case 11, the inner circumferential surface of the prepared first terminal 14 defining the insertion hole 14c has the inclined surface 14c1 of which the diameter increases gradually toward the outer side and the recess 14c2 that is open in the inclined surface 14c1. The recess 14c2 has the bottom 14c3 at a position set back inside the first terminal 14 from the inclined surface 14c1. Then, in the step of crushing the leading end of the shaft part 15c and riveting the leading end around the insertion hole 14c, a portion of the shaft part 15c reaches into the recess 14c2 formed in the inclined surface 14c1 of the first terminal 14. Thus, the sealed battery 10 can be provided in which the first terminals 14 and the second terminals 15 do not easily come apart.

FIG. 5 shows a state where the members have been assembled. As shown in FIG. 5, in this embodiment, the leading end of the shaft part 15c of the second terminal 15 to be prepared has preferably a cylindrical shape. As shown in FIG. 5, the first insulating material 12 and the second insulating material 13 are placed on the lid 11b, and the first terminal 14 and the second terminal 15 are mounted on these insulating materials. In this process, the protrusion 13a of the second insulating material 13 is attached in the recess 11b1 of the lid 11b, and the mounting hole 11c of the lid 11b and the through-hole 13d of the second insulating material 13 are aligned with each other. Next, the collar part 42a of the connection terminal 42 is mounted in the recess 13b of the second insulating material 13 (see FIG. 2). Then, the first terminal 14 is mounted on the second insulating material 13 with the attachment hole 14b of the first terminal 14 attached to the shaft part 42b of the connection terminal 42. In this process, the through-hole 13d of the second insulating material 13 and the insertion hole 14c of the first terminal 14 are aligned with each other. Next, the first insulating material 12 is attached on the inner side of the lid 11b. The cylindrical part 12b of the first insulating material 12 is attached in the mounting hole 11c of the lid 11b. In this embodiment, a projection 11c1 is provided at a rim of the mounting hole 11c on the inner side of the lid 11b. The second terminal 15 is mounted with the shaft part 15c of the second terminal 15 inserted through the cylindrical part 12b of the first insulating material 12.

Next, as shown in FIG. 6, the first terminal 14 and the second terminal 15 are held between a pair of pressing parts 61, 62 of a pressing device, and the first insulating material 12 and the second insulating material 13 are combined so that the lid 11b, the first terminal 14, and the second terminal 15 come in close contact with each other. In this embodiment, the projection 11c1 is provided at the rim defining the mounting hole 11c of the lid 11b, and the projection 11c1 digs into the first insulating material 12 (gasket) on the inner side of the lid 11b. Thus, the lid 11b is kept sealed around the mounting hole 11c.

In this embodiment, the leading end 15c1 of the shaft part 15c has a cylindrical shape. As shown in FIG. 7, a rotating member 60 is pressed against the cylindrical leading end 15c1 of the shaft part 15c while being moved along the leading end 15c1 in a circumferential direction. The rotating member 60 crushes the cylindrical leading end 15c1 of the shaft part 15c sequentially in the circumferential direction. In FIG. 7, a one-dot dashed line A indicates an axis of rotation of the rotating member 60, and a one-dot dashed line B indicates an axis of revolution of the rotating member 60. In this embodiment, the rotating member 60 is pressed against the leading end 15c1 of the cylindrical shaft part 15c while revolving around the axis of revolution that is provided along a central axis of the shaft part 15c. The step of pressing the rotating member 60 against the leading end 15c1 is preferably performed in a state where the first terminal 14 and the second terminal 15 are held between the pair of pressing parts 61, 62 of the pressing device. A portion of the shaft part 15c is plastically deformed and introduced into the recess 14c2 opening in the inclined surface 14c1. In the step of riveting the first terminal 14 and the second terminal 15, at least a portion of the shaft part 15c should reach into the recess 14c2 formed in the inclined surface 14c1 of the first terminal 14. Therefore, the processing method is not limited to the one described above.

Thus, in the sealed battery 10 proposed herein, the first terminal 14 is placed on one side of the lid 11b of the battery case 11 with the second insulating material 13 interposed therebetween as shown in FIG. 2. The first terminal 14 has: the insertion hole 14c that is formed at a position corresponding to the mounting hole 11c of the lid 11b; the inclined surface 14c1 that is located in the inner circumferential surface of the first terminal 14 defining the insertion hole 14c, is formed at the rim on the outer side of the battery case 11, and has a diameter increasing gradually toward the outer side; and the recess 14c2 that is open in the inclined surface 14c1. The recess 14c2 has the bottom at a position set back inside the first terminal 14 from the inclined surface 14c1. The second terminal 15 is placed on the opposite side of the lid 11b with the first insulating material 12 interposed therebetween. The second terminal 15 has the shaft part 15c inserted through the mounting hole 11c and the insertion hole 14c. The leading end of the shaft part 15c is crushed and riveted around the insertion hole 14c on the outer side of the first terminal 14. At least a portion of the shaft part 15c reaches into the recess 14c2 formed in the inclined surface 14c1 of the first terminal 14. Thus, for example, the required joint strength to withstand vibration and shock can be provided without welding. Alternatively, a portion of the riveted shaft part 15c may be combined with the first terminal 14 by welding.

While the sealed battery and the sealed battery manufacturing method proposed herein have been described from various aspects, unless otherwise mentioned, the present disclosure is not limited by the embodiment and the examples presented herein.

What is claimed is:

1. A sealed battery comprising:
   a battery case including a mounting hole;
   one or more insulating materials provided around the mounting hole;
   a first terminal placed on one side of the battery case with the one or more insulating materials interposed between the battery case and the first terminal,
     the first terminal being made of metal and including an insertion hole at a position corresponding to the mounting hole,
     an inner circumferential surface of the first terminal defining the insertion hole including a first rim and a second rim at a position farther away from the one or more insulating materials than the first rim is,
     the second rim including an inclined surface,
     a diameter of the insertion hole at the inclined surface increasing gradually in a direction away from the one or more insulating materials,
     the inclined surface including a recess,
     the recess opening in the inclined surface and including a bottom at a position set back inside the first terminal from the inclined surface; and
   a second terminal placed on other side of the battery case opposite to the one side with the one or more insulating materials interposed between the battery case and the second terminal,
     the second terminal being made of metal and including a shaft part,
     the shaft part being inserted through the mounting hole and the insertion hole,
     a leading end of the shaft part being crushed and riveted on the first terminal,
     at least a portion of the shaft part reaching into the recess in the inclined surface of the first terminal.

2. The sealed battery according to claim 1, wherein the first terminal and the second terminal are made of different materials.

3. The sealed battery according to claim 1, wherein a width of the recess is within a range from 0.1 mm to 0.3 mm.

4. The sealed battery according to claim 1, wherein a depth of the recess is within a range from 0.3 mm to 0.7 mm.

5. The sealed battery according to claim 1, wherein the first terminal is placed on an outer side of the battery case.

6. The sealed battery according to claim 1, wherein the first terminal is placed on an inner side of the battery case.

7. A sealed battery manufacturing method comprising:
   preparing a battery case including a mounting hole, a first terminal being made of metal and including an insertion hole, a second terminal being made of metal and including a shaft part that is insertable through the mounting hole and the insertion hole, and one or more insulating materials;
   placing the first terminal on one side of the battery case, with the one or more insulating materials interposed between the battery case and the first terminal and with the mounting hole and the insertion hole aligned with each other;
   placing the second terminal on other side of the battery case opposite to the one side, with the one or more insulating materials interposed between the battery case and the second terminal and with the shaft part inserted through the mounting hole and the insertion hole; and
   crushing a leading end of the shaft part and riveting the leading end on the first terminal,
     an inner circumferential surface of the first terminal defining the insertion hole including a first rim and a second rim at a position farther away from the one or more insulating materials than the first rim is,
     the second rim including an inclined surface,
     a diameter of the insertion hole at the inclined surface increasing gradually in a direction away from the one or more insulating materials,
     the inclined surface including a recess,
     the recess opening in the inclined surface and including a bottom at a position set back inside the first terminal from the inclined surface,
     when riveting the leading end on the first terminal, a portion of the shaft part reaching into the recess in the inclined surface of the first terminal.

8. The sealed battery manufacturing method according to claim 7, wherein
   the leading end of the shaft part includes a cylindrical shape, and
   when riveting the leading end on the first terminal, a rotating member is pressed against the cylindrical leading end of the shaft part while being moved along the leading end in a circumferential direction of the insertion hole.

9. The sealed battery manufacturing method according to claim 7, wherein the first terminal and the second terminal are made of different materials.

10. The sealed battery manufacturing method according to claim 7, wherein a width of the recess is within a range from 0.1 mm to 0.3 mm.

11. The sealed battery manufacturing method according to claim 7, wherein a depth of the recess is within a range from 0.3 mm to 0.7 mm.

* * * * *